(12) United States Patent
Sigmar et al.

(10) Patent No.: US 10,421,509 B2
(45) Date of Patent: Sep. 24, 2019

(54) METHOD AND APPARATUS FOR MOVING HEAVY OBJECTS

(71) Applicants: Axel Michael Sigmar, Lago Vista, TX (US); Richard Dwaine Souchek, Richmond, TX (US)

(72) Inventors: Axel Michael Sigmar, Lago Vista, TX (US); Richard Dwaine Souchek, Richmond, TX (US)

( * ) Notice: Subject to any disclaimer, the term of this patent is extended or adjusted under 35 U.S.C. 154(b) by 194 days.

(21) Appl. No.: 15/298,113

(22) Filed: Oct. 19, 2016

(65) Prior Publication Data

US 2017/0107087 A1 Apr. 20, 2017

Related U.S. Application Data

(60) Provisional application No. 62/243,495, filed on Oct. 19, 2015.

(51) Int. Cl.
*B62D 57/02* (2006.01)
*B62D 57/024* (2006.01)
*B62D 57/032* (2006.01)

(52) U.S. Cl.
CPC ........... *B62D 57/02* (2013.01); *B62D 57/024* (2013.01); *B62D 57/032* (2013.01)

(58) Field of Classification Search
CPC .... B62D 57/02; B62D 57/022; B62D 57/024; B62D 57/032
See application file for complete search history.

(56) References Cited

U.S. PATENT DOCUMENTS

| 3,255,836 | A | * | 6/1966 | Hoppmann | B62D 57/00 180/8.6 |
| 5,028,180 | A | * | 7/1991 | Sheldon | B23Q 1/5462 248/631 |
| 5,901,936 | A | * | 5/1999 | Bieg | B23Q 1/5462 248/163.2 |
| 6,418,811 | B1 | * | 7/2002 | Rosheim | B25J 17/0266 414/729 |
| 8,573,334 | B2 | * | 11/2013 | Smith | B62D 57/02 180/8.5 |
| 8,956,068 | B2 | * | 2/2015 | Mekid | F16M 11/043 248/176.1 |

(Continued)

OTHER PUBLICATIONS

PCT/US16/57764, International Search Report and Written Opinion, dated Jan. 13, 2017, 9 pages.
Super Stomper, Entro Industries, Jun. 6, 2016, 1 page.

*Primary Examiner* — Tyrone V Hall, Jr.
(74) *Attorney, Agent, or Firm* — Cesari & Reed LLP; R. Michael Reed

(57) ABSTRACT

In some embodiments, a method and apparatus are described for moving heavy objects while providing for precise movements and alignments along any desired path, making the apparatus ideally suited for moving heavy equipment including tunnel boring equipment or structures, such as land drilling rigs. In certain embodiments, an apparatus may include at least two load bearing subassemblies. Each load bearing subassembly can include a support structure configured to support a load, a bearing mat; and a plurality of linear actuators coupled between the support structure and the bearing mat. The plurality of linear actuators may be configured to raise, shift, and lower the load relative to the bearing mat or reference base to move the load.

20 Claims, 14 Drawing Sheets

(56) References Cited

U.S. PATENT DOCUMENTS

| | | | |
|---|---|---|---|
| 9,073,588 B1* | 7/2015 | Squires | B62D 57/032 |
| 2003/0163206 A1* | 8/2003 | Yasui | A61F 2/60 |
| | | | 623/24 |
| 2008/0128214 A1* | 6/2008 | Tahashi | B66F 9/22 |
| | | | 187/224 |
| 2008/0150465 A1* | 6/2008 | Baba | B25J 17/0216 |
| | | | 318/568.12 |
| 2011/0306473 A1* | 12/2011 | Saglia | A61H 1/0266 |
| | | | 482/79 |

* cited by examiner

METHOD AND APPARATUS FOR MOVING HEAVY OBJECTS

CROSS-REFERENCE TO RELATED APPLICATION(S)

The present disclosure is a non-provisional of and claims priority to U.S. Provisional Patent Application No. 62/243,495 filed on Oct. 19, 2015 and entitled "Method and Apparatus for Moving Heavy Objects", which is incorporated herein by reference in its entirety.

FIELD

The present disclosure is generally related to methods and apparatuses configured to move heavy objects while providing for precise movements and alignments along any desired path. In some embodiments, the methods and apparatuses may be used to move heavy equipment or structures, such as tunnel boring equipment, mining equipment, stadium seating assemblies, land drilling rigs, and other heavy equipment.

BACKGROUND

Moving heavy equipment with precision can be difficult. In the example of a land drilling rig, the drilling rig may weigh more than two million (2,000,000) pounds. Further, moving such a drilling rig to a next drilling location can be difficult, particularly if the terrain is uneven or if the path to the next drilling location requires steering the drilling rig along a curved path.

SUMMARY

In some embodiments, a method and apparatus are described for moving heavy objects while providing for precise movements and alignments along any desired path, making the apparatus ideally suited for moving heavy equipment including tunnel boring equipment or structures, such as land drilling rigs. In some embodiments, the methods and apparatus may also be used to move heavy objects that may be interconnected or rigidly connected. The apparatus may provide controlled movement for aligning and connecting or cooperatively moving multiple heavy objects that may be transported separately and operated in combination, whether actually connected or in a defined proximity.

In certain embodiments, a method may include controlling parallel actuator subassemblies in a manner that effectively and safely coordinates/directs the actuators in each of the subassemblies to move the object as directed.

In some embodiments, a method and apparatus are described for moving heavy objects while providing for precise movements and alignments along any desired path, making the apparatus ideally suited for moving heavy equipment including tunnel boring equipment or structures, such as land drilling rigs. In certain embodiments, an apparatus may include at least two load bearing subassemblies. Each load bearing subassembly can include a support structure configured to support a load, a bearing mat; and a plurality of linear actuators coupled between the support structure and the bearing mat. The plurality of linear actuators may be configured to raise, shift, and lower the load relative to the bearing mat to move the load.

In certain embodiments, the apparatus may include multiple load transfer subassemblies, a control system, and a power system. In some embodiments, the heavy equipment may include multiple load transfer subassemblies incorporated therein in sufficient number to achieve the project requirements. Each load transfer subassembly can include a plurality of parallel acting actuators, in which each actuator carries both the vertical supported load and the horizontal forces required to move the heavy object. Further, the load bearing subassemblies may be controlled by a control system configured to direct movement of each of the plurality of actuators through their individual movements to achieve the desired movement of the object.

In some embodiments, the apparatus may include a plurality of moveable elements that provide six degrees of freedom for precise alignment of two large subassemblies and to assure parallel movement of two or more assemblies, which may be interconnected. By controlling the parallel movement with high precision, two or more interconnected assemblies can be moved without generating large stresses that might otherwise be generated if such movements were not controlled.

In some embodiments, simplifications in the joints of a plurality of parallel actuators are selected when the range of desired motion is sufficiently limited. Alternatively, the number of degrees of freedom can be reduced because of other conditions or restraints. Further, simplifications in the joints of the plurality of parallel actuators are selected when the direction and magnitude of the load carried by each of the actuators is sufficiently limited, in order to simplify the load path, the bearing surfaces, and the retention mechanism. Other advantages provided by aspects of the present disclosure may be understood from the following description.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Figure 1:
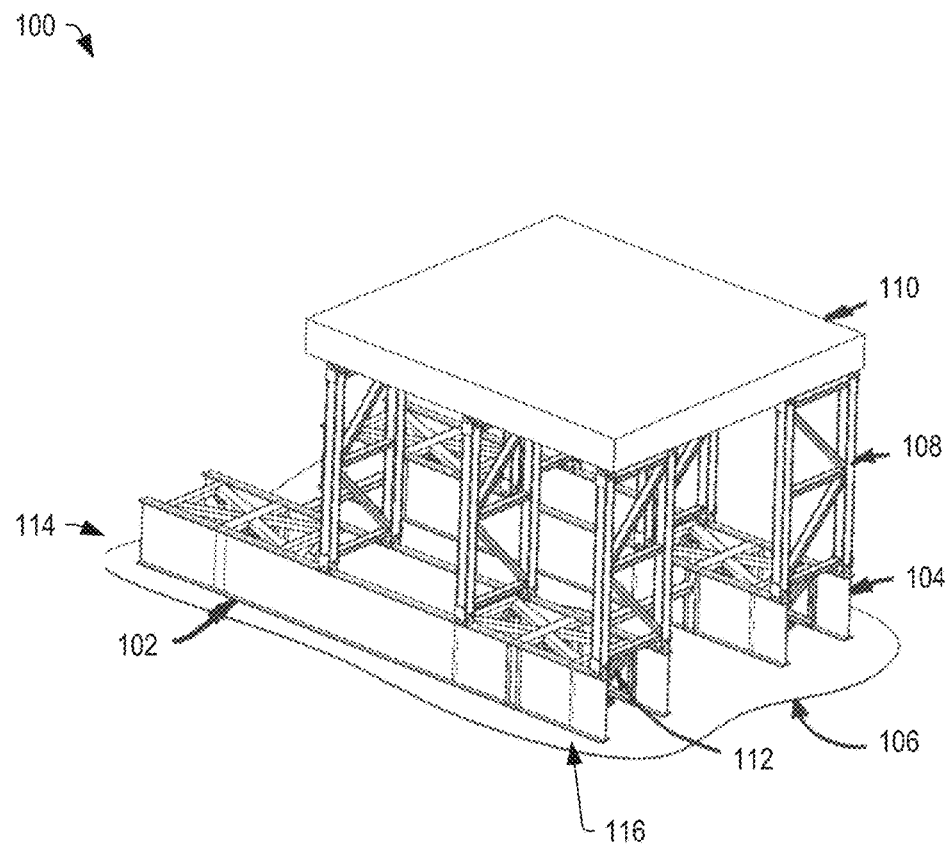
FIG. 1 depicts a perspective view of a substructure of a land drilling rig equipped with a walking system, in accordance with certain embodiments of the present disclosure.

Embodiments of apparatuses and methods are described below that include multiple load transfer subassemblies, which may be can be controlled by a central processing system (control system or controller). In certain embodiments, a system may include the load transfer subassemblies, the control system, and a power system that may be built into a heavy object to be moved or that may be retrofitted to the object. In certain embodiments, the moving system can be used to move any heavy equipment, structure, or object. In an example, the moving system may be incorporated within or retrofitted to the base substructure of a land drilling rig and its auxiliary equipment to render the land drilling rig more mobile.

In some embodiments, a load transfer subassembly may include a mat configured to engage a surface, a support structure coupled to a load to be moved, and a plurality of parallel actuators coupled between the surface and the support structure. Each parallel actuator may be coupled to the mat by a hinged footing or base configured to allow the end of the mat to pivot relative to the end of the actuator. Further, each parallel actuator may be coupled to the support structure by a hinged footing or base configured to allow the actuator to pivot relative to the support structure. By selectively controlling each of the plurality of parallel actuators, the mat may be raised, lowered, and moved relative to the support structure. By controlling multiple load transfer subassemblies in a coordinated manner, it is possible to raise, lower, and move the mat relative to the support structure to walk the load from a first location to a second location with a desired level of precision.

The plurality of parallel actuators and their associated hinged connection points provide six degrees of freedom for precise alignment of two large assemblies. Further, the plurality of parallel actuators may be controlled to avoid large stresses if two or more assemblies are otherwise connected. In particular, by precisely controlling the movement and the timing of movements of each of the various subassemblies, an entire interconnected structure may be moved (walked) using the plurality of parallel actuators without damaging the structure.

In some embodiments, the joints of the plurality of actuators (e.g., the hinged attachment points) can be simplified relative to conventional walking structures. In particular, the plurality of parallel actuators may be selected when a range of desired motion is sufficiently limited or the number of degrees of freedom can be reduced because of other conditions or restraints. Further, the simplifications may be implemented in that the plurality of parallel actuators can be selected when the direction and magnitude of the load carried by each of the actuators is sufficiently limited in order to simplify the load path, the bearing surfaces, and the retention mechanism.

The limitations (and resulting simplifications in the plurality of parallel actuators) of the range of motion, degrees of freedom, and forces allowed on each parallel actuator are monitored and modeled in the central system so that the limits are never exceeded, thus assuring that all design factors of safety are respected at all times. Unsafe conditions can be prevented, and the multiple load transfer assemblies are halted with identification of the load or other unsafe condition clearly communicated to the operator for corrective action.

Typical parallel actuator assemblies require one actuator per degree of freedom in the motion between the plane of reference (e.g., ground) and the plane of the payload carrier. In the present disclosure, the extra parallel actuators are introduced to satisfy other conditions, such as that the individual actuators always remain in compression in some embodiments, or always remain in tension in other embodiments. Thus, the extra actuators can enhance, increase or even maximize the collective load carrying capacity while simplifying each actuator.

In certain embodiments, the load transfer subassemblies may be sufficient in number and distribution to achieve static and dynamic stability for the object's weight and location, desired ground bearing pressure, object strength, and other project requirements. In certain embodiments, the load transfer subassemblies may provide a walking system that can achieve precise movements and alignments along any path, particularly circular and indirect paths. The linear actuators can be small and identical in nature, which allows the moving system to be more cost-effective than conventional systems. Further, the load sharing qualities of parallel acting actuators permit the object support structure and the bearing mat to be lighter and simpler, thus saving money.

Each of the load transfer subassemblies may have its own power source and control system, whether hydraulic or electric, and may incorporate an energy storage capability, which is adjustable for the weight of the payload being carried. The energy storage capability can make it so that the repetitive motion of the load transfer assembly is very efficient, requiring substantially only the energy of moving the payload from one location to another while recapturing excess energy when moving in the other direction (similar to regenerative braking). The load transfer subassemblies can avoid expending energy in one direction and can dissipate that energy in the other direction in each cycle of motion, which reduces the peak power required in each load transfer subassembly. This reduces the size, weight, cost, and cooling apparatus required, and increases the reliability and service life of the subassemblies.

In some embodiments or applications, the payload is moved during a portion of the cycle of motion, and energy can be provided or recaptured from this live load movement, while the energy required and liberated in each cycle from the mass of the mechanism and the attached structure can be recaptured and reused. This recapture and reuse can greatly improve the efficiency of the load transfer subassembly. In a particular embodiment, an energy storage capability, such as a spring element, capacitor, battery, or accumulator may be pre-charged before operating (before load transfer) at a slow rate, and then may be charged and discharged rapidly during the operating cycle, reducing the power that must be produced and dissipated by the load transfer subassembly during each cycle. Further, energy may be transferred from one parallel actuator to another during the cycle of motion to enhance (or maximize) efficiency and reduce the subassembly instantaneous power requirements. A control system may monitor and control the net energy in the load transfer subassembly and in each parallel actuator so that a minimum (or reduced) amount of energy is added or dissipated outside of the system.

For a rectangular structure, such as a drilling rig substructure, a load transfer subassembly may be located at each of the four corners of the support base boxes as described below with respect to FIG. 1. Further, the load transfer subassembly may also be located at additional locations with respect to the load, depending on the implementation.

FIG. 1 is a perspective view of a substructure 100 of a land drilling rig equipped with a walking system, in accordance with certain embodiments of the present disclosure. The substructure 100 includes a Driller's Side (DS) base box 102 and an Off Driller's Side (ODS) base box 104, which may rest on bearing ground 106. The DS base box 102 and the ODS base box 104 may support a substructure 108 on which a floor 110 may be provided.

The rear and forward portions of the DS and ODS base boxes 102 and 104 include load transfer subassemblies, generally indicated at 112, which can be located at the rear portion 114 and forward portion 116 of each of the base boxes 102 and 104. In some embodiments, additional load transfer subassemblies may also be included at other locations. The load transfer subassemblies 112 can be used to raise and move the DS and ODS base boxes 102 and 104 and the associated substructure 108 and floor 110.

Each load transfer subassembly 112 may include a bearing mat (or foot), a plurality of linear actuators, a support structure built into the movable object (e.g., into the DS and ODS base boxes 102 and 104), a set of control lines connecting the plurality of parallel, linear actuators to a controller, and power lines or hoses to power the actuator subassemblies. Each linear actuator may have additional equipment at both the top and bottom of the actuator. In some embodiments, the additional equipment can act as a spherical bearing. The lower end of each linear actuator can be coupled to the bearing mat and the upper end of the linear actuator can be coupled to the support structure incorporated into the movable object. Embodiments of the load transfer subassembly are described below with respect to FIGS. 2 and 3.

Figure 2A:
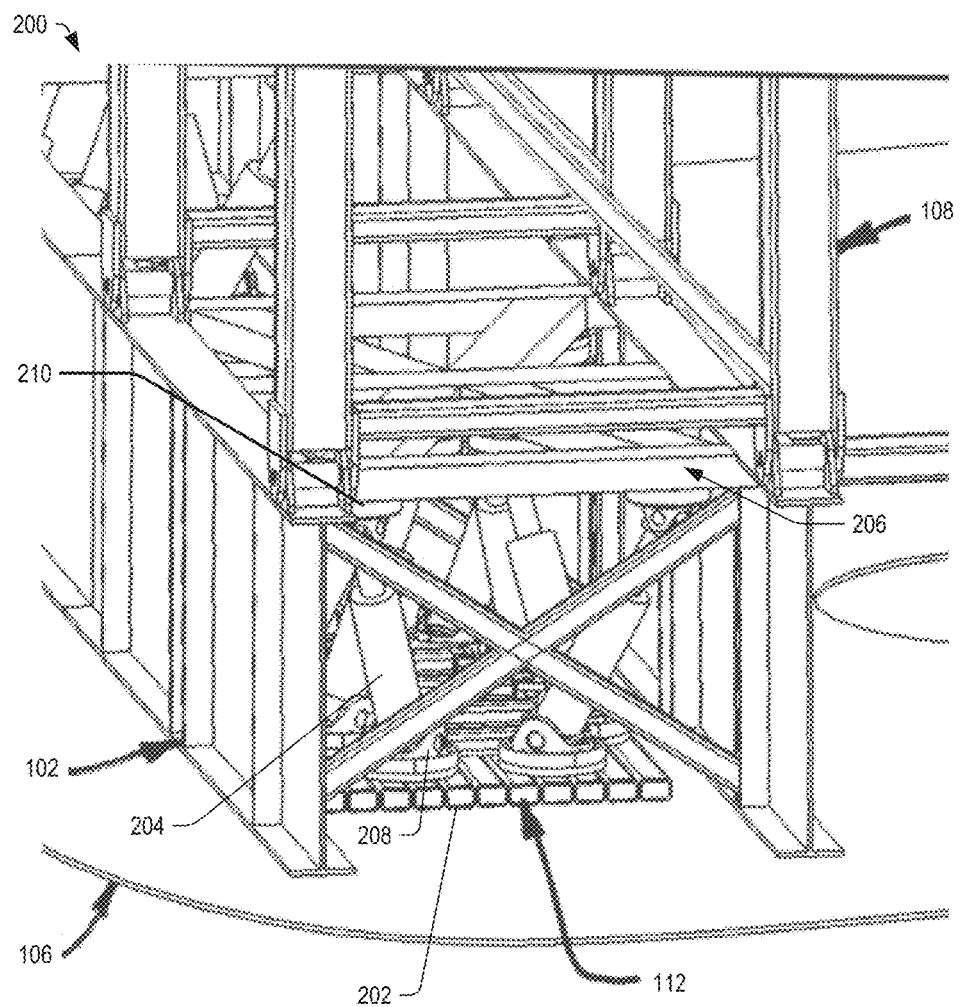
FIG. 2A depicts a perspective, close-up view of a driller's side (DS) forward substructure corner showing load transfer subassemblies of a walking system, in accordance with certain embodiments of the present disclosure.

FIG. 2A is a perspective, close-up view of a DS forward substructure corner 200 showing load transfer subassemblies 112 of a walking system, in accordance with certain embodiments of the present disclosure. The DS forward substructure corner 200 represents a forward portion 116 of the DS base box 102 showing the load transfer subassembly 112.

The load transfer subassembly 112 may include a bearing mat (or foot) 202, a plurality of linear actuators 204, and a support structure built into the movable object (generally indicated at 206). Each linear actuator 204 may be coupled to the bearing mat 202 by a swivel joint 208 and to the support structure 206 by a swivel joint 210. The swivel joints 208 and 210 can act as spherical bearings and can allow for limited angular variations between the linear actuator 204 and the bearing mat 202 during movement operations as discussed below with respect to FIGS. 4-10. In an example, the swivel joints 208 and 210 may include a base including bearings to enable rotation of the base relative to the bearing mat 202 or relative to the support structure 206. Further, the linear actuators 204 may be pinned to the swivel joints 208 and 210 by a bolt or pin, and the linear actuators 204 may be configured to pivot about the bolt or pin. In some embodiments, the bolt or pin and the rotatable base can cooperate to provide three or more degrees of freedom on each end of each linear actuator 204.

In general, the actuators 204 enable and restrict movement of the bearing mat 206 to provide a range of freedom in any direction. In some embodiments, the range of freedom may be restricted to approximately three degrees of freedom by the interdependencies of the plurality of actuators 204 and their limited variations in tilt angles and rotation as constricted by the swivel joints 208 and 210 and their respective arrangements. Four degrees of freedom may be provided if rotation is included. Further, the control system may be configured to control each actuator 204 independently such that some may have the same controls while others may vary.

Typical parallel actuator assemblies may require one actuator per degree of freedom in the motion between the plane of reference (such as the ground) and the plane of the payload carrier (such as the support structure 206). In contrast, the parallel actuators 204 are introduced to satisfy other conditions, such as that the individual actuators 204 always remain in compression, in some embodiments, or remain in tension in other embodiments. Thus, the configuration of the parallel actuators 204 can maximize a collective load-carrying capacity while simplifying each actuator.

In an example, a "home" position is provided with support posts and means for locking the base to the payload for transportation and installation of the individual load transfer subassemblies. In the "home" position, with the base locked to the payload, or in any designated stable and safe geometry, a virtual "home" may be designated by the operator. In this safe "home" position, one or more of the actuators 204 may be placed in a neutral, non-load bearing state. For example, a selected actuator 204 may be placed in the neutral, non-load bearing state by adjusting its length and verifying that it carries no load. Once in this state, the selected actuator 204 may be removed and replaced for maintenance and repair.

In some embodiments, circuitry may be included at or within the swivel joints 208 and 210 and coupled to the actuators to recover and accumulate energy during operations. In an example, a hydraulic storage unit may be provided with each subassembly, such that work energy imparted to the system when lifting the object can be at least partially recaptured when the actuators 204 are retracted to set the object the ground. In other words, the work done to raise the structure may be recaptured when the structure is lowered. Similar to regenerative braking, the energy may be recaptured and stored in a spring element, a capacitor, a battery, an accumulator, an oil over nitrogen piston, an oil over spring piston, another component, or any combination thereof. Subsequently, when the object is to be raised again, the stored work energy may be used to at least partially restore the actuators 204 to their "raised" state, thereby enhancing the efficiency of the system.

Further, in some embodiments, the actuators 204 may include integrated valves, integrated sensors and the like. In some embodiments, control circuitry may be localized within each subassembly or may be distributed among the various actuators 204.

In the example embodiment of FIG. 2A, the swivel joints 208 and 210 couple the actuators 204 to the substructure 206 and to the mat or foot 202. In an alternative embodiment, another type of joint may be used. For example, in a particular embodiment where all of the actuators 204 are maintained in compression, the swivel joints 208 and 210 may be replaced with a ball joint as depicted in FIG. 2B.

Figure 2B:
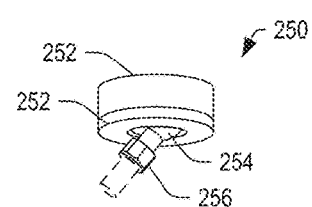
FIG. 2B depicts a ball joint that may be configured to couple at least one end of each of a plurality of parallel actuators to a substructure, to a foot or mat, or both, in accordance with certain embodiments of the present disclosure.

FIG. 2B depicts a ball joint 250 that may be configured to couple at least one end of each of a plurality of parallel actuators 204 to a substructure 206, to a foot or mat 202, or both, in accordance with certain embodiments of the present disclosure. In this example, the ball joint 250 may include a socket 252, a retention device 354, a ball stud 254, and a connector 256 configured to engage an end of the actuator 204. In some embodiments, the ball stud 254 may be integrated with the end of the actuator 204. It should be appreciated that, depending on the size of the load, the forces imparted onto the actuators 204 may determine the type of attachment that can be used. Further, the type of attachment may determine or may be determined by the limitations that may be imposed on the subassembly. Other embodiments are also possible, such as a universal joint or a variation thereof.

Figure 3:
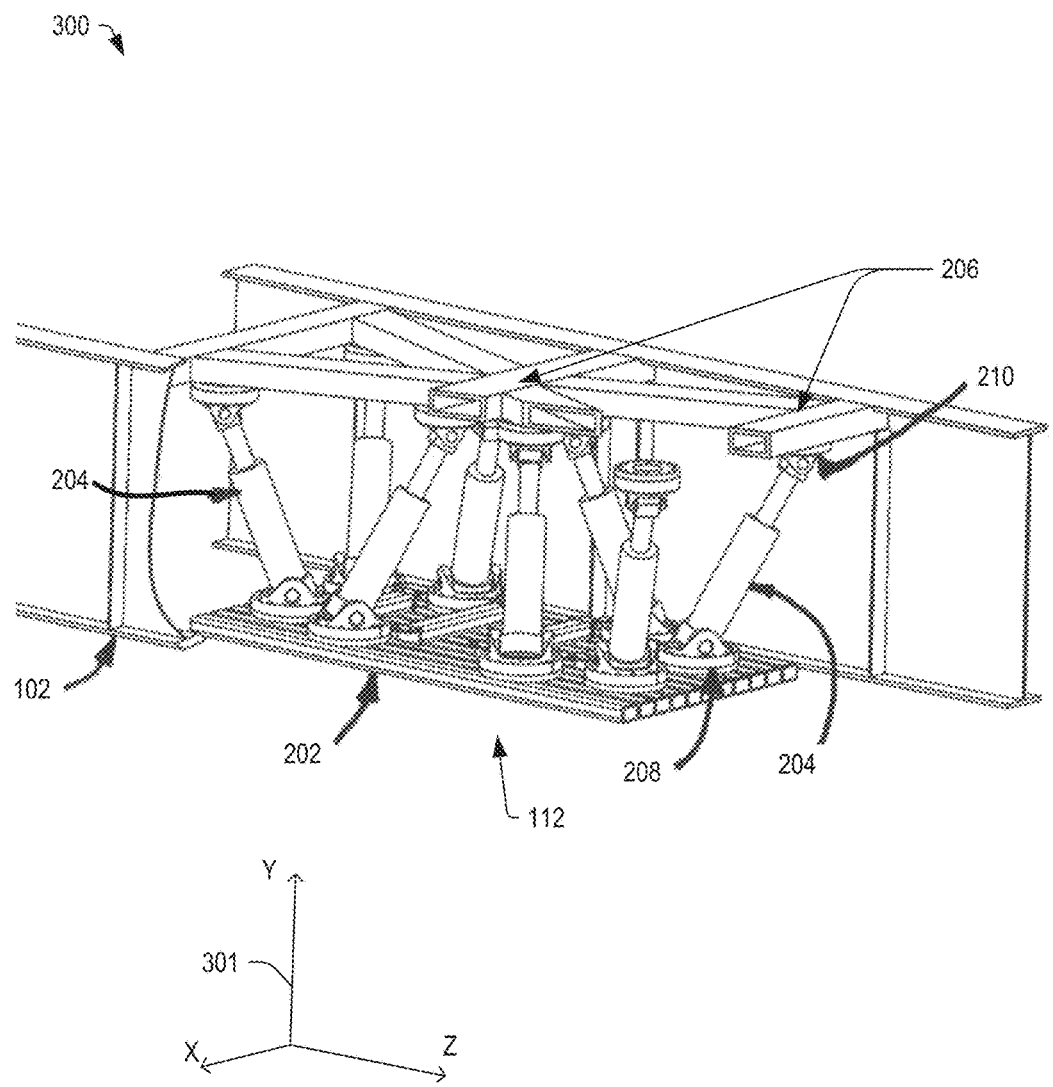
FIG. 3 depicts a perspective, close-up view of the DS forward substructure corner showing load transfer subassemblies of a walking system with the base box structure cut away, in accordance with certain embodiments of the present disclosure.

FIG. 3 is a perspective, close-up view 300 of the DS forward substructure corner 200 of FIG. 2, showing load transfer subassemblies of a walking system with the base box structure cut away, in accordance with certain embodiments of the present disclosure. Each of the load transfer subassemblies 112 contains a plurality of linear actuators 204 in an arrangement dependent upon the moving object properties, ground bearing pressures and bearing mat sizes, maximum step distances in all three directions (indicated by the axis 301) plus some rotation, available power, and many other variables. In the illustrated embodiment, eight linear actuators 204 were used to keep each actuator 204 substantially in compression, in this particular example. Further, the linear actuators 204 provide the ability to monitor forces and maintain alignment. Four linear actuators 204 have first ends that are substantially co-located at an attachment area of the support structure 206 approximately above a center of mass of the bearing mat 202. These linear actuators have second ends coupled in a rectangular configuration toward a middle portion of the bearing mat 202. The other four linear actuators 204 have first ends that are coupled to the support structure 206 approximately above corners of the bearing mat 202. These linear actuators have second ends that are coupled to the bearing mat 202 near peripheral corners of the bearing mat 206.

Each of the eight linear actuators 204 may be coupled to the support structure 206 by a swivel joint 210 and to the bearing mat 202 by a swivel joint 208. The swivel joints 208 and 210 may act as spherical bearings. Each of the eight linear actuators 204 extends between the bearing mat 202 and the support structure 206 at an angle other than ninety-degrees and takes a portion of both the vertical lift force and horizontal movement forces. The top swivel joint 210 and the bottom swivel joint 206 act as spherical bearings such that the linear actuators 204 will only act in tension or compression. Thus, when the linear actuators 204 are inclined and directed by a controller, each of the linear actuators 204 will move in both directions as required to produce the overall object movement. The load transfer subassembly 112 provides a system of parallel actuators 204, each one with its own movement, and the movements of the parallel actuators 204 combine to achieve the desired overall movement of the bearing mat 202.

One advantage provided by the multiple actuators 204 is that the loading each one of the linear actuators 204 is much smaller than the loading of conventional lift cylinders. Further, the multiple actuators 204 achieve a reduced overall cost. Further, each of the multiple parallel linear actuators 204 applies a smaller reaction force on the object, so the support structure 206 transferring the moving loads into the object to be moved can be much smaller than conventional moving systems. Further, the load transfer subassemblies 112 can be relatively small as compared to conventional systems, and the reduced size makes it possible to retrofit the load transfer subassemblies 112 into existing structures easier than other options.

In certain embodiments, by retracting some of the actuators 204 and extending others of the actuators 204, the load transfer subassembly 112 may move the bearing mat 202 in a selected direction within the framework of the base box 102. The swivel joints 206 and 210 make such relative movements possible. Further, by extending the actuators 204, the load transfer subassembly 112 may lift the base box 102 above the ground and advance the base box 102 in a selected direction. In some embodiments, the bearing mats can be rotated to maintain relative alignment. The rig can be rotated about its geometric center or a virtual center by a combination of translation and rotation of each load transfer subassembly (bearing mat).

Examples of movement of the bearing mat 202 using the actuators 204 are described below with respect to FIGS. 4-10, which show perspective views of the DS forward substructure corner 200 with the load transfer subassembly 112 of the walking system moving the base box 102 in a forward (selected) direction (Z-Direction according to axis 301) one step at a time, in accordance with certain embodiments of the present disclosure.

In certain embodiments, movement of the heavy object is accomplished by raising and the bearing mats 202 of the load transfer subassemblies 112 and positioning them in the direction of travel. The bearing mats 202 can be lowered to the ground and the actuators 204 can continue to extend, lifting the heavy object above the ground. By controlling the linear actuators 204 simultaneously, the entire heavy object can be lifted above the ground and all of the linear actuators 204 can be moved to produce one forward step of the heavy object. The linear actuators 204 may then be retracted to raise the bearing mat 206 and to lower the heavy object to the ground. The next step forward may be accomplished by raising the bearing mats 202 in unison, selectively retracting some of the linear actuators 204 and extending others to cycle the bearing mat 202 to set up for another step. In general, the linear actuators 204 in each load transfer subassembly 112 operate in unison, working together to move the object in the desired distance and/or alignment.

In certain embodiments, because of the configuration of the actuators, transverse movement of the heavy object is caused by simply performing a different set of instructions. Thus movement in a straight direction plus a 90° turn in movement for the heavy object can be achieved by a different set of input and output controls to the linear actuators 204. In an example, the system 200 may utilize a selected point about which the turn will be performed. The selected point may be at a center of the structural load being moved or may be at another location, which may be selected based on any number of factors, including the desired position and orientation of the structural load, terrain considerations, other parameters, or any combination thereof. Further, a controller may provide the movement control signals and may be programmed to control the actuators to perform various object movements, such as crabbing diagonally, rotating the object around a point, walking forward while rotating the object direction, or other directional and orientation movements that can be programmed.

Figure 4:
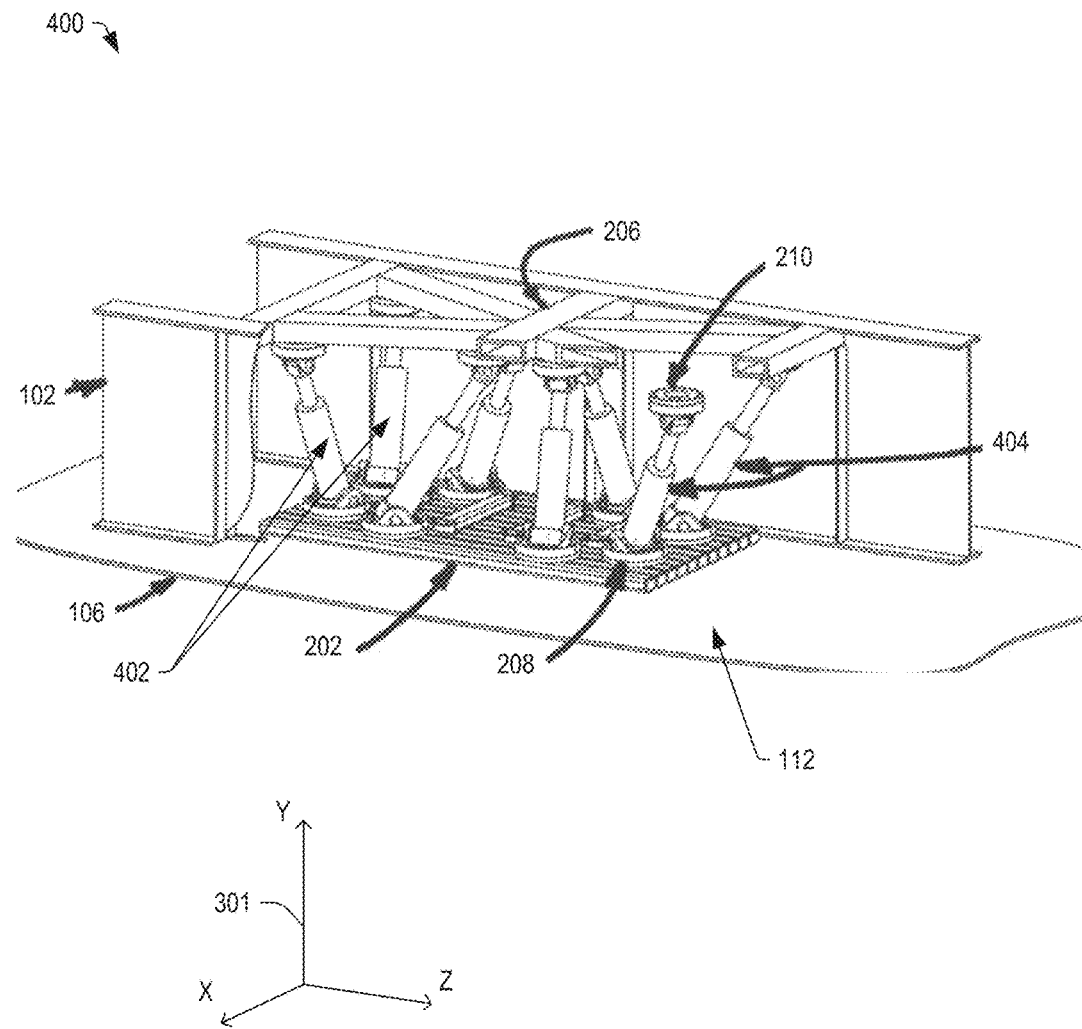
FIGS. 4-10 illustrate perspective views of the DS forward substructure corner showing load transfer subassemblies of a walking system moving the structure in a forward direction one step at a time, in accordance with certain embodiments of the present disclosure.

Referring now to FIG. 4, a starting position of the bearing mat 202 is shown. In the starting position, the rearward actuators 402 are slightly more retracted than the forward actuators 404. In this starting position, the bearing mat 202 and the base box 102 are on the ground with the bearing mat 202 half a step toward the rear of the base box 102.

Figure 5:
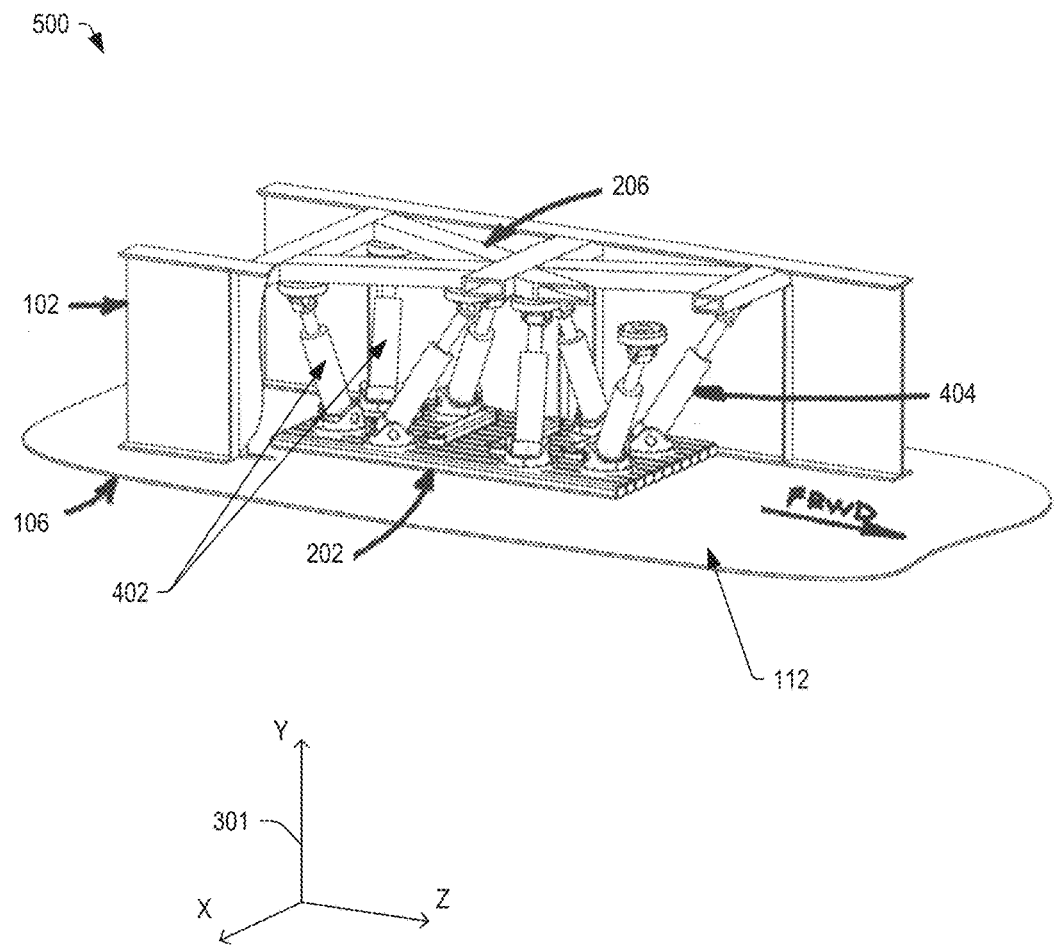

In FIG. 5, the bearing mat 202 is being raised above the ground by retracting the linear actuators 204. Once the bearing mat 202 is raised, base box 102 rests on the ground. All of the moving loads are transferred to the ground through the structure of the base box 102.

Figure 6:
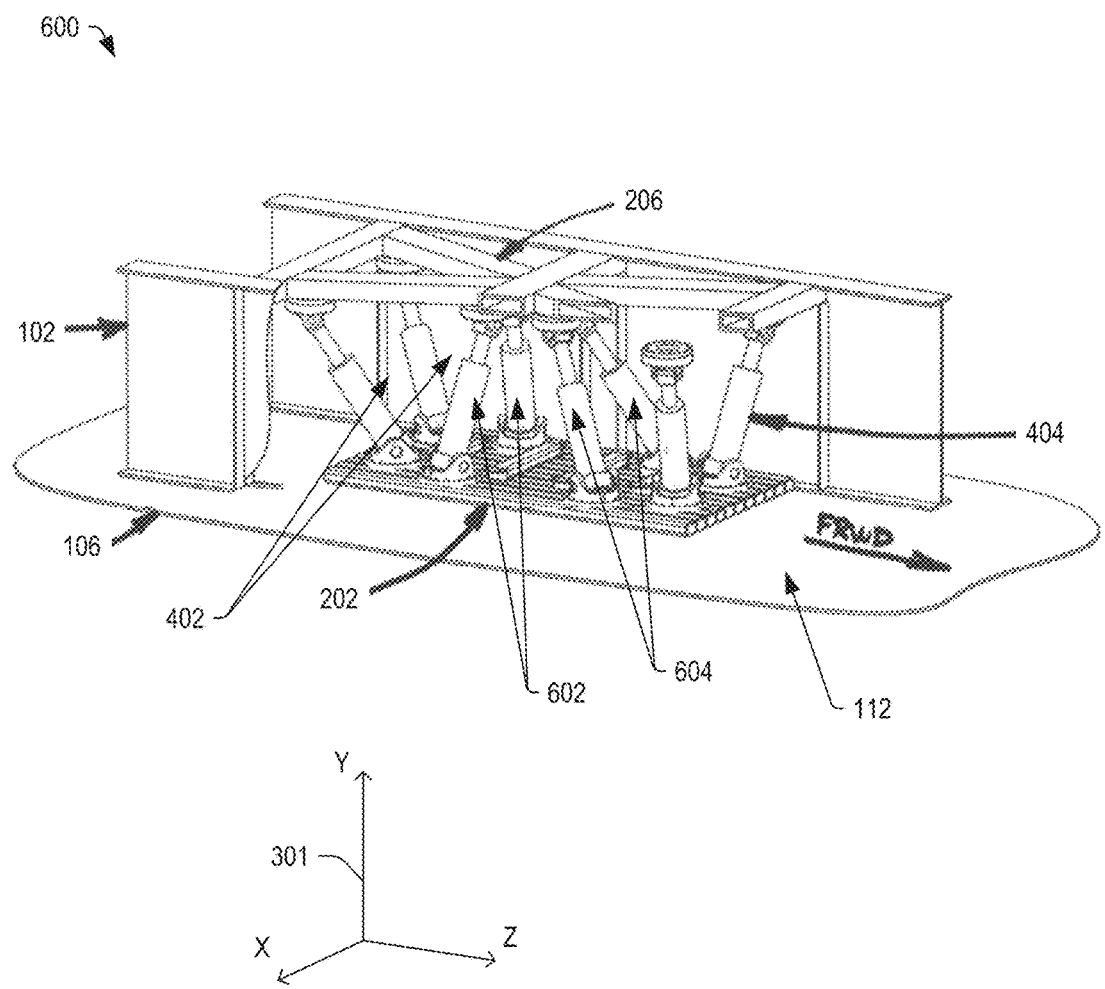

In FIG. 6, the bearing mat 202 is being moved in a Z-direction (forward) in preparation for taking a step. In the illustrated example, the forward actuators 404 remain retracted (or may retract further) while the rear actuators 402 extend. The rearward intermediate actuators 602 and the forward intermediate actuators 604 may be independently adjusted to maintain the bearing mat 202 above the ground while the rearward intermediate actuators 402 extend. Thus, the bearing mat 202 may be moved a half step toward the forward end of the base box 102.

Figure 7:
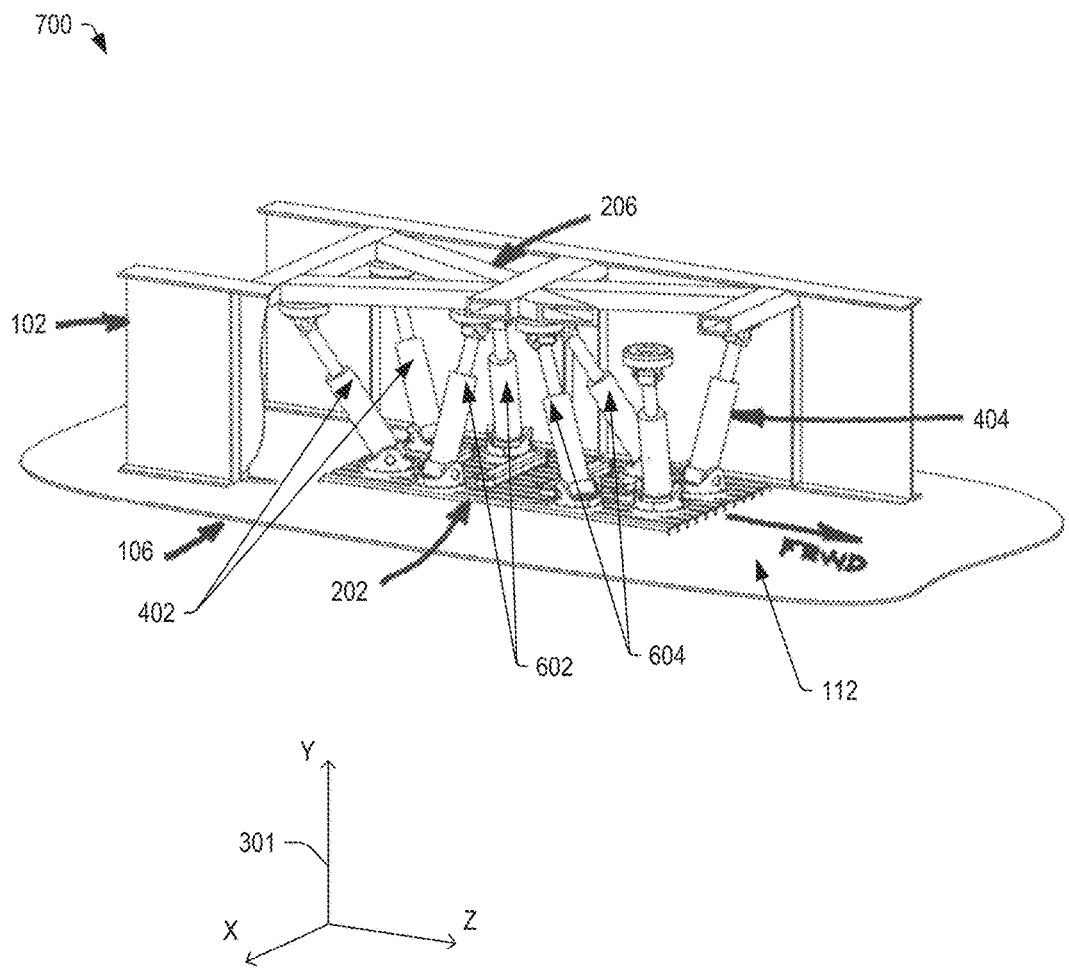
Figure 8:
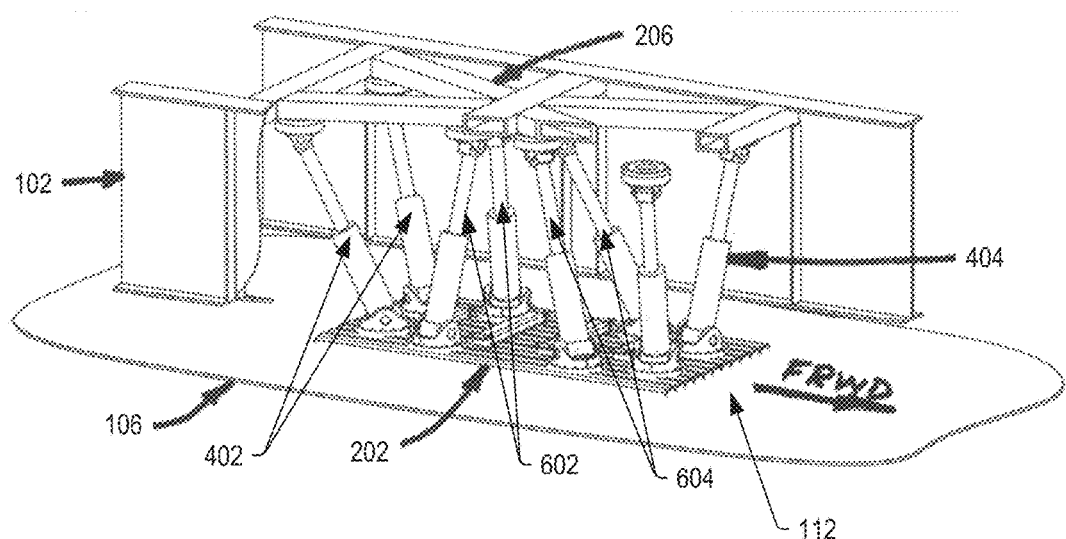
Figure 8:
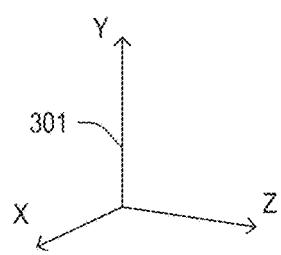

In FIG. 7, the bearing mat 202 is lowered to the ground by extending the actuators 402, 404, 602 and 604. In FIG. 8, the actuators 402, 404, 602, and 604 may extend to move the bearing mat 202 in a negative Y-direction, raising the base box 102 above the ground in the positive Y-direction.

Figure 9:
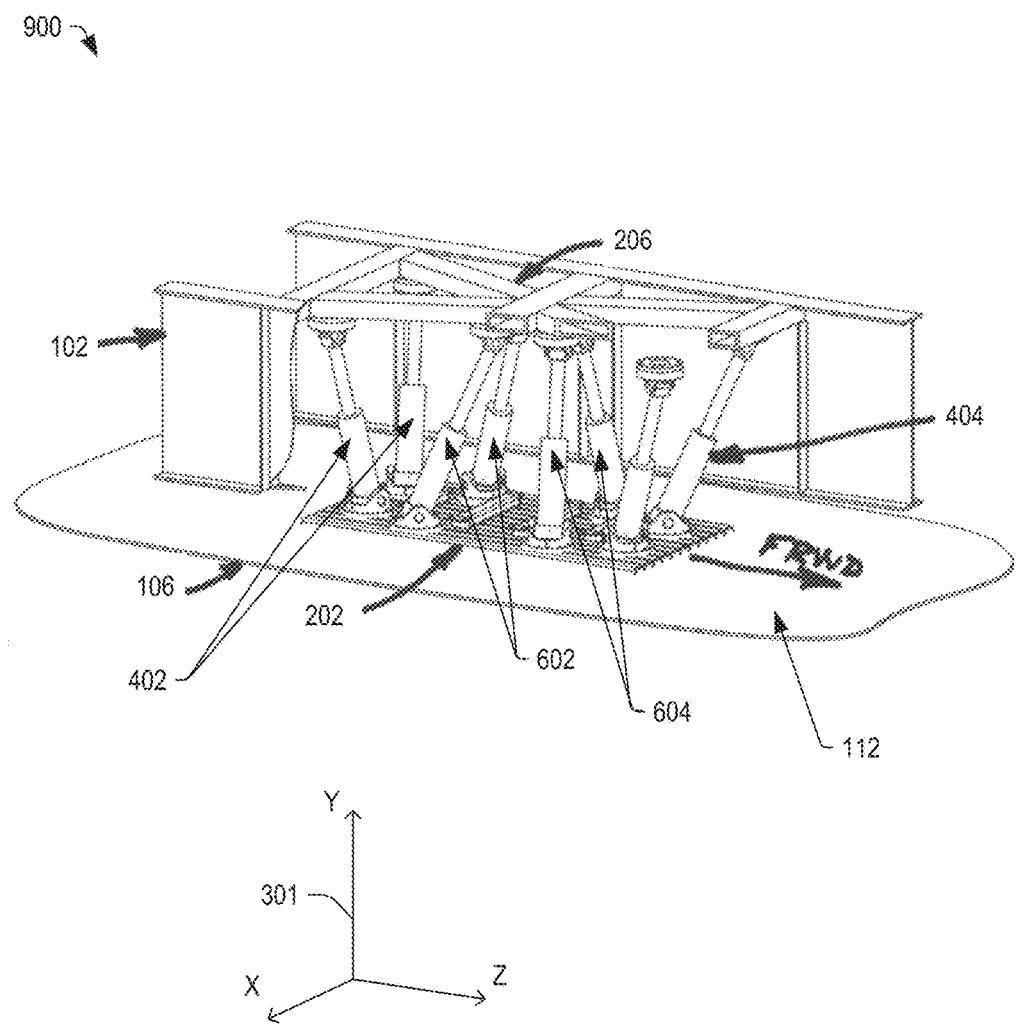

In FIG. 9, some of the actuators, such as actuators 402 may be retracted, and actuators 602 may be extended to walk the object in a forward direction by one step, moving the bearing mat 202 toward the rear of the base box 102. This rearward movement with the base box 102 above the ground causes the base box 102 to be moved in the Z-direction.

Figure 10:
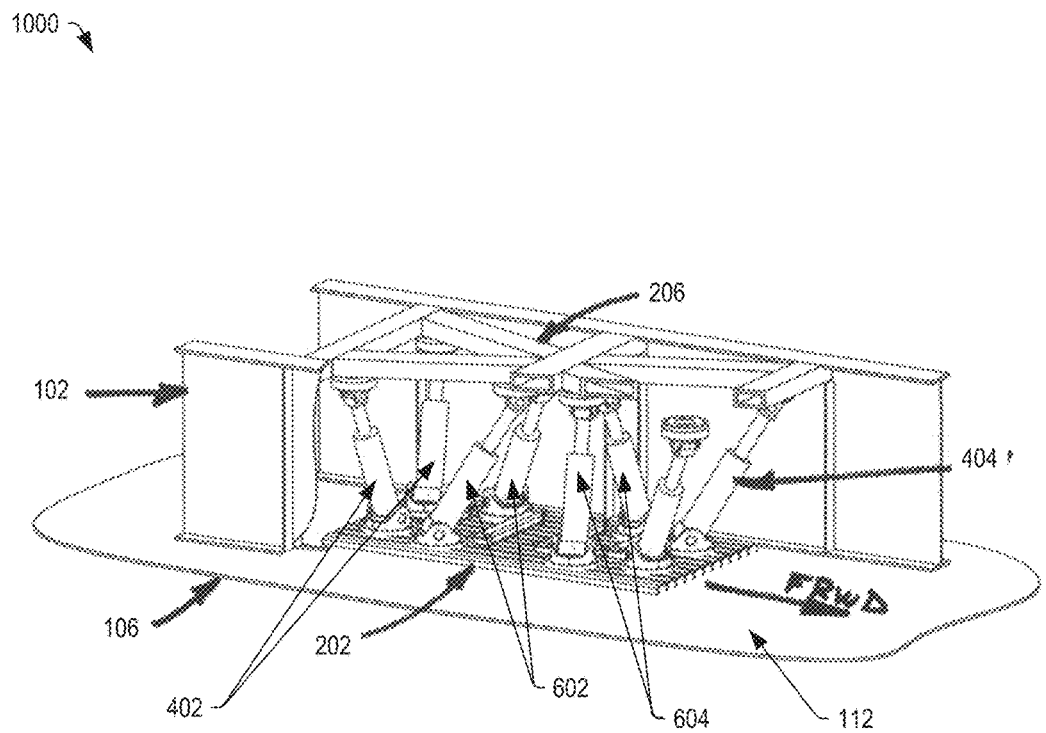

In FIG. 10, the actuators 402, 602, 604, and 404 are retracted, raising the base mat 202 above the ground and effectively lowering the base box 102 onto the ground. In the illustrated example, the base mat 202 is returned to its starting position as described above in FIG. 4.

In general, the load bearing subassemblies may rely on a power system to power the actuators. The power system can include any means or combination of means necessary to operate the linear actuators. In certain embodiments, the power system may include a combination of both electrical and hydraulic power.

In some embodiments, the walking system can include a hydraulic power source (HPU) integral with the bearing mat 202. A power supply may extend to each bearing mat HPU, which would supply the necessary hydraulic power for all actuators on this load transfer subassembly 112. In this implementation, the walking system would include three or more load transfer subassemblies, a system controller, and control and power lines connecting the components.

Figure 11:
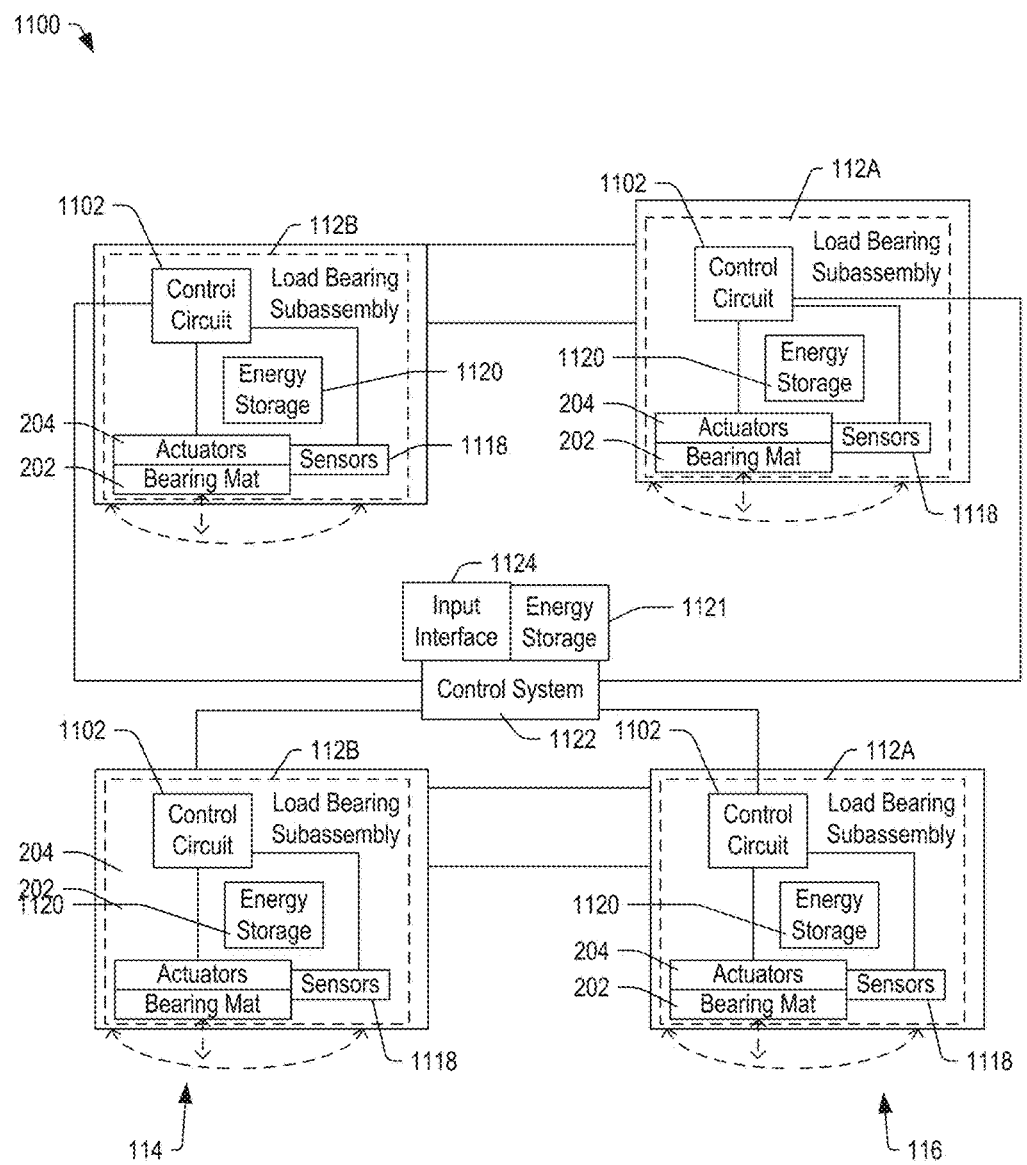
FIG. 11 depicts a block diagram of a system configured to control the load transfer subassemblies of the walking system, in accordance with certain embodiments of the present disclosure.

FIG. 11 is a block diagram of a system 1100 configured to control the load transfer subassemblies of the walking system, in accordance with certain embodiments of the present disclosure. The system 1100 may include DS base box 102 and ODS base box 104. The DS base box 102 may include the load bearing subassembly 112B within the rear portion 114 and the load bearing subassembly 112A within the forward portion 116. Further, the ODS base box 104 may include the load bearing subassembly 112B within the rear portion 114 and the load bearing subassembly 112A within the forward portion 116. It should be appreciated that, while the system 1100 includes four load-bearing subassemblies, the system 1100 may include four or more load-bearing subassemblies.

In certain embodiments, the load bearing subassembly 112B may include a control circuit 1102 coupled to the plurality of actuators 204, which are coupled to the bearing mat 202. The control circuit 1102 may also be coupled to one or more sensors 1108, which may be coupled to or integrated within the actuators 204, coupled to the bearing mat 202, or any combination thereof. The load bearing subassembly 112A may also include a control circuit 1112 coupled to the plurality of actuators 204, which are coupled to the bearing mat 202. The control circuit 1112 may also be coupled to one or more sensors 1118, which may be coupled to or integrated within the actuators 204, coupled to the bearing mat 202, or any combination thereof.

The control circuits 1102 and 1112 may be communicatively coupled to a control system 1122. In certain embodiments, the control system 1122 may include an interface coupled via wired or wireless communication links to the control circuits 1102 and 1112. The control system 1122 may also be coupled to an energy storage element 1121, which may be configured to store overflow charge from charge regeneration and optionally to store charge to provide peak power assistance. In some embodiments, each control circuit 1102 and the control system 1122 may include a power management unit (not shown), which may be configured to direct charge between the energy storage 1120 of each of the load bearing subassemblies 112 and between the energy storage 1121 of the control system 1122 and that of the subassemblies 112. Further, the control system 1122 may include a processor coupled to the interface, and a memory accessible to the processor for storing data and instructions that may be executed by the processor. In some embodiments, the control system 1122 may be a smart phone, a tablet computer, a laptop computer, or another portable electronic device. In some embodiments, the control system 1122 may be coupled to an input interface, which may include a touchscreen, a joystick, a keypad, or any combination thereof. In certain embodiments, an operator may interact with the control system 1122 through the input interface 1124 to control the actuators 204 and to move the physical system, including the base box 102, the base box 104 (in FIG. 1), and the entire associated load.

In certain embodiments, the control system 1122 may receive instructions for movement from an input interface, from another electronic device, or any combination thereof. The control system 1122 may check (determine) the location, orientation, extension, and inclinations of the linear actuators 204, the bearing mat 106, and support steel 206 at each of the load transfer subassemblies 112 and compiles the results. The control system 1122 may then determine extensions or retractions of each of the linear actuators in order to achieve the requested movement and/or alignment of the entire object to be moved/aligned. The control system 1122 may transmit signals to each of the linear actuators 204, which will respond to these signals as directed.

The control system 1122 may continue to check all of the sensors in each load transfer subassembly 112 and can update the linear actuator control signals as needed to achieve the overall object movement or alignment. In an example, one of the four load transfer subassemblies may encounter a softer area on the ground than the other three subassemblies. The control system 1122 may determine that the load transfer subassembly 112 encountering the softer area would sink into the ground further than the other three. In such an example, the control system 1122 may determine that that unique load transfer subassembly 112 is lower than the others and that the forces acting on the linear actuators 204 in the load transfer subassembly 112 are less than in others. In response to the determination, the control system 1122 may adjust the control signals to those linear actuators, allowing for the difference in bearing depth and inclination, to achieve their normal support loads.

In some embodiments, each load bearing subassembly 112A and 112B may include an energy storage component 1120, which may be configured to be charged over time during non-use and to provide a power buffer during operation. The energy storage component 1120 may be a spring, a capacitor, a battery, an accumulator, a hydraulic pressure storage element, another component, or any combination thereof.

In certain examples, the payload can moved during a portion of the cycle of motion by controlling the actuators 204 via control signals from the control system 1122 to the control circuits 1102 in each of the load bearing subassemblies 112A and 112B. In some embodiments, work may be performed by extending the actuators 204 to push the bearing mat 202 against a surface (such as the ground) to raise the structural load. Kinetic energy from this raising may be recaptured when the actuators 204 are retracted, and the energy recaptured from this movement of the structural load may be stored in the energy storage component 1120 and can be reused for subsequent movements. This recapture and reuse can greatly improve the efficiency of the load transfer subassembly. In a particular embodiment, the energy storage component 1120 may be pre-charged before operating (before load transfer) at a slow rate, and then may be charged and discharged rapidly during the operating cycle (by applying and recovering energy to and from the movement of the actuators and the structure), reducing the power that must be produced and dissipated by the load transfer subassembly 112 during each cycle. Further, energy may be transferred from one parallel actuator 204 to another during the cycle of motion to enhance (or maximize) efficiency and reduce the subassembly instantaneous power requirements. The control system 1122 may monitor and control the net energy in the load transfer subassembly 112 (using information from the sensors 1118) and in each parallel actuator so that a minimum (or reduced) amount of energy is added or dissipated outside of the system 1100. Other embodiments are also possible.

Figure 12:
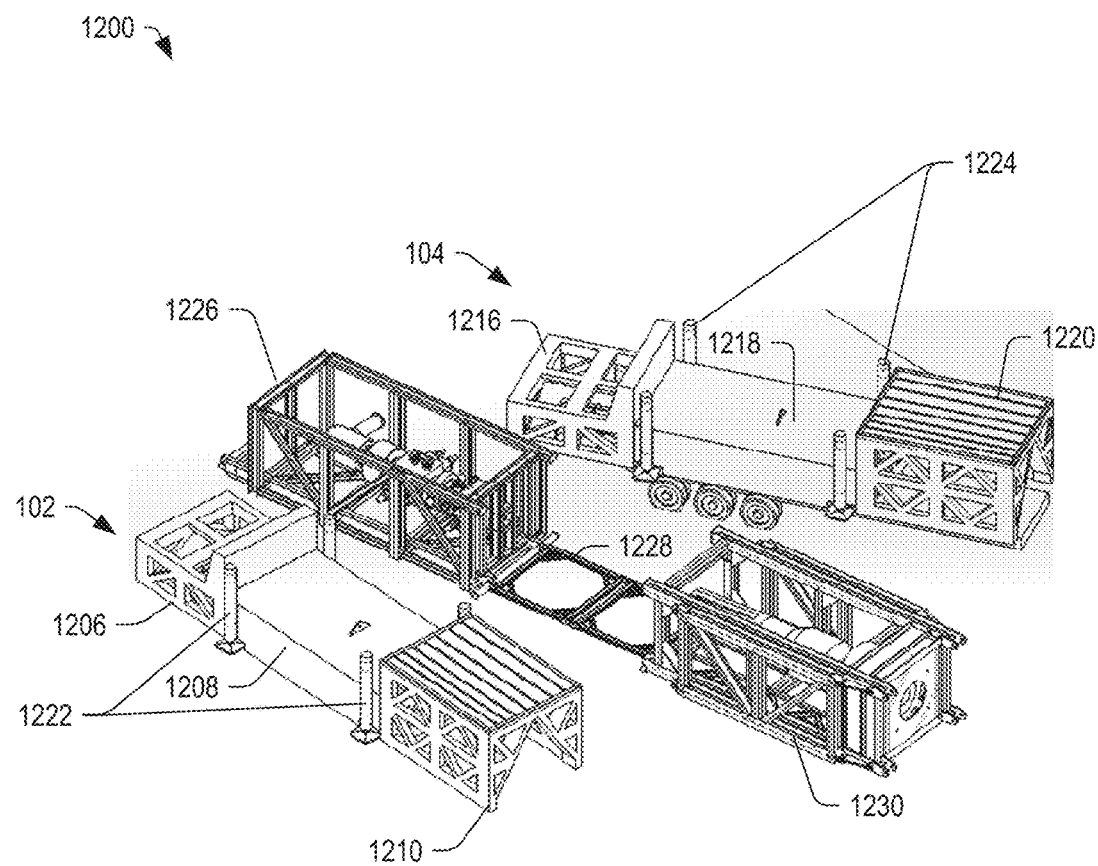
FIG. 12 illustrates a perspective view of components of a land drilling rig including a trunk assembly and DS base box and Off Driller's Side (ODS) base boxes equipped with a walking system, in accordance with certain embodiments of the present disclosure.

FIG. 12 is a perspective view 1200 of components of a land drilling rig including a trunk assembly (including a rear trunk 1226, a center trunk 1230, and an alignment frame 1228), a Driller's Side (DS) base box 102, and an Off Driller's Side (ODS) base box 104 equipped with a walking system, in accordance with certain embodiments of the present disclosure. In certain embodiments, the DS base box 102 may include a rear portion 1206, a center portion 1208, and a forward portion 1210. The rear portion 1206 and the forward portion 1210 may house load bearing subassemblies 112. The ODS base box 102 may include a rear portion 1216, a center portion 1218, and a forward portion 1220. The rear portion 1216 and the forward portion 1220 may house load bearing subassemblies 112.

During rig up processes, the base boxes 102 and 104 may be transported on a flatbed trailer to rig up site. Once at the site, lift cylinders 1222 may raise the base box 102 vertically, and the trailer may be driven out from under the base box 102. The lift cylinders 1222 may then be lowered to set the base box 102 on the ground. In the illustrated example, the DS base box 102 has been unloaded onto the ground, and the ODS base box 104 is still on the trailer. Once the DS base box 102 is unloaded, it may be coupled to the control system 1122 and walked into position adjacent the trunk assembly using the load bearing subassemblies 112 as described above with respect to FIGS. 4-10. Similarly, once the ODS base box 104 is unloaded, it may be coupled to the control system 1122 and walked into position adjacent the trunk assembly using the load bearing subassemblies 112. Once the drilling rig is rigged up, the same load bearing subassemblies 112 may be used to walk the entire assembled rig to a next drill site.

Figure 13:
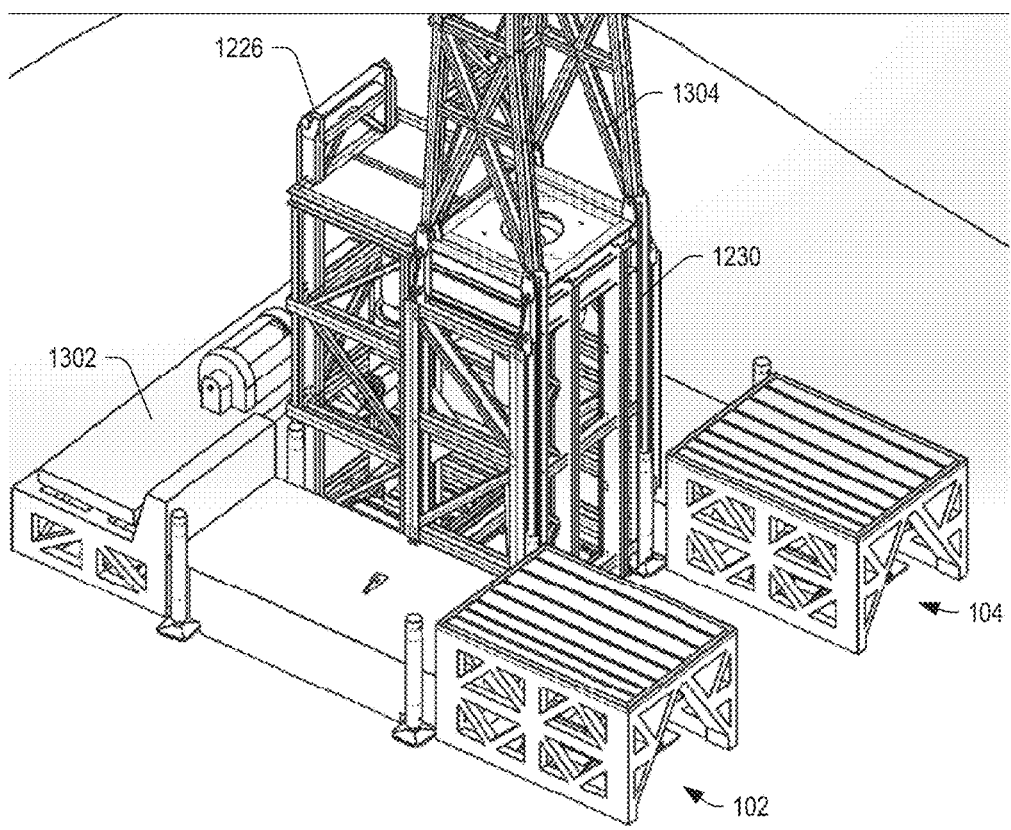
FIG. 13 depicts a perspective view of a portion of a land drilling rig including DS and ODS base boxes equipped with a walking system, in accordance with certain embodiments of the present disclosure.

FIG. 13 is a perspective view of a portion of a land drilling rig 1300 including DS and ODS base boxes 102 and 104 equipped with a walking system, in accordance with certain embodiments of the present disclosure. In the illustrated example, a drawworks 1302 is provided on rear portions of the DS and ODS base boxes 102 and 104. Further, the rear trunk 1226 and the center trunk 1230 have been pivoted on the frame to a vertical orientation that forms a drill floor. Further, a mast 1304 may be coupled to the center trunk 1230.

In certain embodiments, the DS base box 102 and the ODS base box 104 each include a pair of load bearing subassemblies 112, one in the rear portion and one in the forward portion, which allow the base boxes 102 and 104 to be moved. Further, once the drill rig 1300 is assembled, the control system 1122 in FIG. 11 may control the load bearing assemblies to move the entire drilling rig 1300 by coordinating the movement of the actuators 204.

Figure 14:
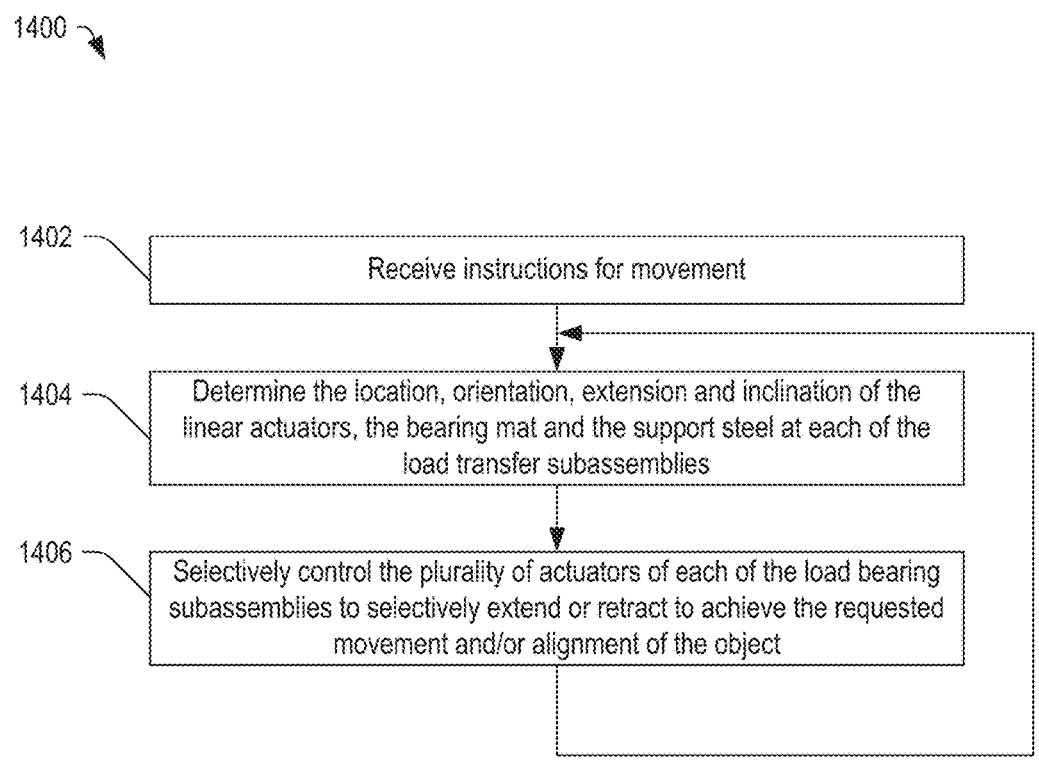
FIG. 14 illustrates a flow diagram of a method of controlling the load bearing subassemblies to provide a walking system, in accordance with certain embodiments of the present disclosure.

FIG. 14 is a flow diagram of a method 1400 of controlling the load bearing subassemblies to provide a walking system, in accordance with certain embodiments of the present disclosure. At 1402, the method 1400 may include receiving instructions for movement. The instructions may be received from an input interface, from another computing device, from an operator, or any combination thereof.

At 1404, the method 1400 may further include determining the location, orientation, extension and inclination of the linear actuators, the bearing mat and the support steel at each of the load transfer subassemblies. In some embodiments, the data may be determined from sensors embedded within the actuators, from sensors mounted to the actuators and the bearing mat, or any combination thereof.

At 1406, the method 1400 may include selectively controlling the plurality of actuators of each of the load bearing subassemblies to selectively extend or retract to achieve the requested movement and/or alignment of the object. In some embodiments, one or more of the actuators may be retracted, while one or more of the actuators may be extended in order to move the bearing mat. The method 1400 may then return to 1404 to determine data about the linear actuators, the bearing mat, and the support steel.

Because of the parallel actuator configuration, linear movement can be caused by a first set of instructions, while transverse movement of the heavy object can be caused by different set of instructions. Thus, movement in a straight direction plus a 90° turn in movement for the heavy object is really just a different set of input and output controls to the linear actuators. Likewise the control system can be configured to control the load bearing subassemblies to coordinate selected movements, such as crabbing diagonally, rotating the object around the point, walking forward while rotating the object direction, or whatever can be programmed into the control system.

In certain embodiments, the control system may be implemented as a computing device having a processor and a memory device coupled to the processor and configured to store instructions that, when executed, cause the processor to determine extension/retraction and orientation data for a plurality of linear actuators. Once determined, the control system may send control signals to the actuators to move the entire system. The control system may be used during load/unload operations, during rig up and rig-down processes, or in any situation in which heavy objects are to be moved.

In conjunction with the systems, apparatus, and methods described above with respect to FIGS. 1-14, a system may include the load transfer subassemblies, the control system, and a power system that may be built into a heavy object to be moved or that may be retrofitted to the object. In certain embodiments, the moving system can be used to move any heavy equipment, structure, or object. In an example, the moving system may be incorporated within or retrofitted to the base substructure of a land drilling rig to render the land drilling rig mobile.

In some embodiments, a load transfer subassembly may include a mat configured to engage a surface, a support structure coupled to a load to be moved, and a plurality of parallel actuators coupled between the surface and the support structure. Each parallel actuator may be coupled to the mat by a hinged footing or base configured to allow the end of the mat to pivot relative to the end of the actuator. Further, each parallel actuator may be coupled to the support structure by a hinged footing or base configured to allow the actuator to pivot relative to the support structure. By selectively controlling each of the plurality of parallel actuators, the mat may be raised, lowered, and moved relative to the support structure. By controlling multiple load transfer subassemblies in a coordinated manner, it is possible to raise, lower, and move the mat relative to the support structure to walk the load from a first location to a second location with a desired level of precision.

The plurality of parallel actuators and their associated hinged connection points provide six degrees of freedom for precise alignment of two large assemblies. Further, the plurality of parallel actuators may be controlled to avoid large stresses if two or more assemblies are otherwise connected. In particular, by precisely controlling the movement and the timing of movements of each of the various subassemblies, an entire interconnected structure may be moved (walked) using the plurality of parallel actuators without damaging the structure.

In some embodiments, the joints of the plurality of actuators (e.g., the hinged attachment points) can be simplified relative to conventional walking structures. In particular, the plurality of parallel actuators may be selected when a range of desired motion is sufficiently limited or the number of degrees of freedom can be reduced because of other conditions or restraints. Further, the simplifications may be implemented in that the plurality of parallel actuators can be selected when the direction and magnitude of the load carried by each of the actuators is sufficiently limited in order to simplify the load path, the bearing surfaces, and the retention mechanism.

The limitations (and resulting simplifications in the plurality of parallel actuators) of the range of motion, degrees of freedom, and forces allowed on each parallel actuator are monitored and modeled in the central system so that the limits are never exceeded, thus assuring that all design factors of safety are respected at all times. Unsafe conditions can be prevented, and the multiple load transfer assemblies are halted with identification of the load or other unsafe condition clearly communicated to the operator for corrective action.

In the present disclose, the extra parallel actuators are introduced to satisfy other conditions, such as that the individual actuators always remain in compression in some embodiments, or always remain in tension in other embodiments. Thus, the extra actuators can enhance, increase or even maximize the collective load carrying capacity while simplifying each actuator.

In certain embodiments, the load transfer subassemblies may be sufficient in number and distribution to achieve static and dynamic stability for the object's weight and location, desired ground bearing pressure, object strength, and other project requirements. In certain embodiments, the load transfer subassemblies may provide a walking system that can achieve precise movements and alignments along any path, particularly circular and indirect paths. The linear actuators can be small and identical in nature, which allows the moving system to be more cost-effective than conventional systems. Further, the load sharing qualities of parallel acting actuators permit the object support structure and the bearing mat to be lighter and simpler, thus saving money.

Each of the load transfer subassemblies may have its own power source and control system, whether hydraulic or electric, and may incorporate an energy storage capability, which is adjustable for the weight of the payload being carried. The energy storage capability can make it so that the repetitive motion of the load transfer assembly is very efficient, requiring substantially only the energy of moving the payload from one location to another while recapturing excess energy when moving in the other direction (similar to regenerative braking). The load transfer subassemblies can avoid expending energy in one direction and can dissipate that energy in the other direction in each cycle of motion, which reduces the peak power required in each load transfer subassembly. This reduces the size, weight, cost, and cooling apparatus required, and increases the reliability and service life of the subassemblies.

In some embodiments or applications, the payload is moved during a portion of the cycle of motion, and energy can be provided or recaptured from this live load movement, while the energy required and liberated in each cycle from the mass of the mechanism and the attached structure can be recaptured and reused. This recapture and reuse can greatly improve the efficiency of the load transfer subassembly. In a particular embodiment, an energy storage capability, such as a spring element, capacitor, battery, or accumulator may be pre-charged before operating (before load transfer) at a slow rate, and then may be charged and discharged rapidly during the operating cycle, reducing the power that must be produced and dissipated by the load transfer subassembly during each cycle. Further, energy may be transferred from one parallel actuator to another during the cycle of motion to enhance (or maximize) efficiency and reduce the subassembly instantaneous power requirements. A control system may monitor and control the net energy in the load transfer subassembly and in each parallel actuator so that a minimum (or reduced) amount of energy is added or dissipated outside of the system.

Although the present invention has been described with reference to preferred embodiments, workers skilled in the art will recognize that changes may be made in form and detail without departing from the scope of the invention.

What is claimed is:

1. An apparatus comprises:
   at least two load bearing subassemblies, each load bearing subassembly including:
      a support structure configured to support a load, the support structure including at least one sidewall to support the load;
      a bearing mat that is smaller than the support structure; and
      a plurality of linear actuators coupled between the support structure and the bearing mat, the plurality of linear actuators configured to raise, shift, and lower the bearing mat relative to an underlying surface and to raise, shift, and lower the support structure and the load relative to the bearing mat to move the load, each linear actuator including a first end coupled to the support structure by a first joint and including a second end coupled to the bearing mat by a second joint, the plurality of linear actuators including:
first and second linear actuators coupled between a first end of the support structure and a first end of the bearing mat;
third and fourth linear actuators coupled between a second end of the support structure and a second end of the bearing mat; and
fifth, sixth, seventh, and eighth linear actuators coupled between a middle portion of the support structure and a middle portion of the mat;
wherein the plurality of linear actuators cooperate to control a selected position of the mat relative to the support structure.

2. The apparatus of claim 1, further comprising a circuit coupled to the plurality of linear actuators and configured to independently control each of the plurality of linear actuators such that at least some of the plurality of linear actuators define variable angles relative to one of the bearing mat and the support structure to control the selected position between the support structure and the bearing mat.

3. The apparatus of claim 1, further comprising:
a plurality of joints including the first joint and the second joint;
wherein each joint comprises a hinged swivel joint comprising:
a first swivel coupled to the support structure and configured to turn relative to the support structure;
a first pin to couple the first end of the linear actuator to the first swivel, the linear actuator to pivot about the first pin;
a second swivel coupled to the bearing mat and configured to turn relative to the bearing mat; and
a second pin to couple the second end of the linear actuator to the second swivel, the linear actuator to pivot about the second pin.

4. The apparatus of claim 1, further comprising a plurality of joints including the first joint and the second joint, wherein the plurality of joints includes a ball joint.

5. The apparatus of claim 1, further comprising a plurality of sensors coupled to or integrated with at least one of the plurality of linear actuators, the bearing mat, and the support structure.

6. The apparatus of claim 5, further comprising a control system coupled to the plurality of sensors and to the plurality of linear actuators, the control system configured to determine adjustment data for each load bearing substrate to control each linear actuator to achieve a selected movement.

7. The apparatus of claim 1, wherein each load bearing subassembly further includes an energy storage component configured to recover energy from movement.

8. The apparatus of claim 1, wherein each of the plurality of linear actuators cooperates to provide three or more degrees of freedom of movement relative to each of the first joint and the second joint.

9. An apparatus comprising:
a plurality of subassemblies configured to support a load, each subassembly including:
a bearing mat;
a support structure to support the load, the support structure being larger than the bearing mat; and
a plurality of linear actuators coupled between the bearing mat and the support structure, the plurality of linear actuators to raise, shift, and lower the bearing mat relative to an underlying surface and to raise, shift, and lower the support structure relative to the underlying surface to move the support structure and the load, each linear actuator configured to move in response to a control signal, the plurality of linear actuators including:
a first pair of linear actuators coupled between a first edge of the support structure and a first edge of the bearing mat;
a second pair of linear actuators coupled between a second edge of the support structure and a second edge of the bear mat; and
two pairs of linear actuators coupled between a middle portion of the support structure and a middle portion of the bearing mat; and
a control system coupled to each of the plurality of subassemblies, the control system configured to selectively control one or more actuators of the plurality of linear actuators within each of the plurality of subassemblies to move the load.

10. The apparatus of claim 9, wherein the plurality of linear actuators is configured to raise, shift, and lower the load relative to the bearing mat to move the load.

11. The apparatus of claim 10, wherein at least some of the plurality of linear actuators define variable angles relative to displacements of one of the bearing mat and the support structure.

12. The apparatus of claim 10, further comprising:
a plurality of joints; and
wherein each linear actuator is coupled to the bearing mat at a first end by a first joint of the plurality of joints and is coupled to the support structure at a second end by a second joint.

13. The apparatus of claim 12, wherein the plurality of joints includes at least one of a swivel joint and a ball joint.

14. The apparatus of claim 10, further comprising a plurality of sensors coupled to or integrated with at least one of the plurality of linear actuators, the bearing mat, and the support structure.

15. The apparatus of claim 9, wherein each load bearing subassembly further includes an energy storage component configured to recover energy from movement.

16. The apparatus of claim 9, wherein each of the plurality of linear actuators cooperate to provide three or more degrees of freedom of movement.

17. An apparatus comprising:
a plurality of load bearing subassemblies, each load bearing subassembly including comprising:
a support structure including at least one sidewall configured to support a load;
a bearing mat that is smaller than the support structure; and
a plurality of linear actuators coupled between the support structure and the bearing mat, the plurality of linear actuators configured to raise, shift, and lower the bearing mat relative to an underlying surface and to raise, shift, and lower support structure and the load relative to the bearing mat to move the load, the plurality of linear actuators including:
a first pair of linear actuators including first ends coupled to a first portion of the support structure and including second ends coupled to a first portion of the bearing mat;
a second pair of linear actuators including first ends coupled to a second portion of the support structure and including second ends coupled to a second portion of the bearing mat; and
at least two pairs of linear actuators including first ends coupled to a middle portion of the support structure and including second ends coupled to a middle portion of the bearing mat; and wherein at least some of the plurality of linear actuators are independently actuatable relative to others of the plurality of linear actuators.

18. The apparatus of claim 17, wherein each load bearing subassembly further includes an energy storage component configured to recover energy from movement.

19. The apparatus of claim 17, further comprising:

a plurality of joints; and wherein each linear actuator is coupled to the bearing mat at a first end by a first joint of the plurality of joints and is coupled to the support structure at a second end by a second joint.

20. The apparatus of claim 19, wherein the plurality of joints includes at least one of a swivel joint and a ball joint.

* * * * *